United States Patent
Windhager et al.

(10) Patent No.: US 12,367,722 B2
(45) Date of Patent: Jul. 22, 2025

(54) ACCESS CONTROL TERMINALS

(71) Applicant: Axess AG, Anif/Salzburg (AT)

(72) Inventors: Christian Windhager, Elsbethen (AT);
Oliver Suter, Bad Duerrnberg (DE);
Daniel Wakounig, Maria Rain (AT);
Josef Fischer, Hallein (AT)

(73) Assignee: AXESS AG, Anif/Salzburg (AT)

( * ) Notice: Subject to any disclaimer, the term of this patent is extended or adjusted under 35 U.S.C. 154(b) by 33 days.

(21) Appl. No.: 18/201,445

(22) Filed: May 24, 2023

(65) Prior Publication Data
US 2024/0395090 A1     Nov. 28, 2024

(51) Int. Cl.
*G07C 9/15*     (2020.01)
*G07C 9/00*     (2020.01)
*G07C 9/22*     (2020.01)
*G07C 9/28*     (2020.01)
*H04B 17/318*   (2015.01)

(52) U.S. Cl.
CPC ........... *G07C 9/15* (2020.01); *G07C 9/00309* (2013.01); *G07C 9/22* (2020.01); *G07C 9/28* (2020.01); *H04B 17/318* (2015.01); *G07C 2009/00793* (2013.01); *G07C 2209/64* (2013.01)

(58) Field of Classification Search
None
See application file for complete search history.

(56) References Cited

U.S. PATENT DOCUMENTS

| | | |
|---|---|---|
| 8,079,515 B2 | 12/2011 | Kocznar et al. |
| 10,163,178 B1 | 12/2018 | Sprogis et al. |
| 10,356,550 B2 | 7/2019 | Smith et al. |

(Continued)

FOREIGN PATENT DOCUMENTS

| | | |
|---|---|---|
| AT | A 51013/2020 | 11/2020 |
| EP | 1 990 777 | 11/2008 |

(Continued)

OTHER PUBLICATIONS

International Search Report issued Mar. 25, 2022 in International (PCT) Application No. PCT/AT2021/060437.

(Continued)

*Primary Examiner* — Carlos Garcia
(74) *Attorney, Agent, or Firm* — Wenderoth, Lind & Ponack, L.L.P.

(57) ABSTRACT

An access control terminal includes guidance members to establish an access lane having a signal- or blocking element and a multi-beam phased antenna array. An electronic gate controller is connected to the multi-beam phased antenna array to communicate via Bluetooth protocol with mobile Bluetooth communication devices. A proximity sensor is arranged within the access lane to detect a patron approaching an entry area of the access lane, and the gate controller is configured to enable data input supplied by the Bluetooth protocol via the multi beam phased antenna array after the proximity sensor indicates the presence of a patron to request transmission of the access credentials from the smartphone. The gate controller is configured to command the signal- or blocking element to move to the open state if the access credentials are validated and the field strength indicator (RSSI) values are within predefined limits.

3 Claims, 2 Drawing Sheets

(56) References Cited

U.S. PATENT DOCUMENTS

| | | | |
|---|---|---|---|
| 11,092,663 B2* | 8/2021 | Schuehler | G06K 7/10356 |
| 11,153,708 B2 | 10/2021 | Smith et al. | |
| 11,265,674 B2 | 3/2022 | Smith et al. | |
| 2009/0032585 A1 | 2/2009 | Kocznar et al. | |
| 2018/0068315 A1 | 3/2018 | Bergdale et al. | |
| 2018/0144563 A1 | 5/2018 | Reymann | |
| 2018/0213355 A1 | 7/2018 | Smith et al. | |
| 2018/0374180 A1 | 12/2018 | Sprogis et al. | |
| 2019/0297454 A1 | 9/2019 | Smith et al. | |
| 2020/0045537 A1 | 2/2020 | Colombo | |
| 2020/0128354 A1 | 4/2020 | Smith et al. | |
| 2022/0182781 A1 | 6/2022 | Smith et al. | |
| 2022/0335765 A1 | 10/2022 | Hall et al. | |
| 2023/0215234 A1 | 7/2023 | Faresse | |

FOREIGN PATENT DOCUMENTS

| | | |
|---|---|---|
| WO | 2018/112224 | 6/2018 |
| WO | 2021/245098 | 12/2021 |
| WO | 2022/104404 | 5/2022 |

OTHER PUBLICATIONS

Wikipedia Entry for "Bluetooth Low Energy", https://en.wikipedia.org/wiki/Bluetooth_Low_Energy.

* cited by examiner

ACCESS CONTROL TERMINALS

BACKGROUND OF THE INVENTION

The invention generally relates to access control terminals for patrons whose access credentials are stored in smartphones or comparable devices with Bluetooth communication interfaces.

Electronic ticketing systems are known in many applications. There are applications that distinguish between access control terminals for so called gated areas, as well as applications without access terminals (so called be-in/be-out). Both types may be combined in some cases.

The term ticket here means the right to have access to a specific service and/or location. Access rights may be specific in terms of time, location or value and personal (non-transferable) or transferable. The ticket may be issued as printed or electronic media and/or it is stored in a database as an authorization.

The present invention relates to applications in which gated areas are at least partially required, as is the case in ski resorts, but not restricted to this application. The entrances in ski areas are more and more organized using access terminals with mechanical guidance members forming one or more access lanes, readers for tickets are arranged in each access lane. The readers check the tickets of the person entering and, after positive validation, command a release signal to a barrier in the access lane. The barrier can be a turnstile, a swing gate, an optical signal, etc.

At the early stage of the so-called ski pass systems, barcode tickets or magnetic cards were used as a ticket medium, the readers were accordingly insert-readers for barcodes or magnetic-stripe-cards. In order to eliminate the maintenance needs of mechanical systems, these readers have been replaced by contactless RFID transponders, with LF (125 kHz), HF (13.56 MHZ) and in the latest systems also UHF (900 MHZ) radio communication, known as RFID technologies. However, a drawback of ticket systems using physical ticket media is the need to provide ticket media and suitable ticket printers in order to organize ticket sales.

Since most people already own smartphones, the possibility of using a smartphone as a ticket medium would be advantageous. To use a smartphone for boarding at an airport, it is known to store the ticket (the boarding pass) in the smartphone in the form of a barcode or a QR-Code. But this kind of use cannot be applied to applications with multiple access points. At the entrance, the smartphone must be taken out of the pocket, the ticket called up and presented to an optical reader. It is obvious that the described handling with ski gloves and frequent use would be too burdensome.

It has also been proposed to use the radio communication in smartphones such as NFC (Near Field Communication) or Bluetooth. For NFC the available communication distance is only one or two inches and therefore it creates the same hassle as a barcode.

Bluetooth is a standardized technology for data transmission in the 2.4 GHz ISM band, and was developed to network devices in an area of up to 10 meters. Using Bluetooth as a communication channel between a mobile device (ticket) and the reader in an access lane has not prevailed so far because-due to the large range—there is no guarantee that the data of the correct person (smartphone) will be used and processed.

US 2018/0068315 addresses the use of mobile phones in transit stations. By using multiple Bluetooth beacons arranged in the lane of an entry gate plus additional camera systems, the actual location of certain mobile phones holding the access credentials can be determined. Beside the fact that the equipment complexity of this proposed solution is very high, the results are not satisfying.

US 2018/0374180 describes the general problems of Bluetooth based access control more in detail and proposes to install an omnidirectional location transmitter with longer range (see FIG. 4). This omnidirectional location transmitter transmits a location signal, received by the approaching mobile phones and initiating a so-called pre-check-in. The access terminal further includes for each lane a multi-beam phased antenna array arranged in front of the gate threshold. This multi-beam phased antenna array creates radiation fans with different directions analyzing the received signal strength indicator (RSSI) of each fan to determine the position of the pre-checked-in mobile device. Depending on the result of this analysis, a barrier in the lane is opened to finish the check-in. The results of the solution described above are still not sufficient. It can be observed that the passenger flow stocks from time to time and the throughput is too low.

A proposal to improve the passenger flow is described in WO/2022104404. The access terminal described comprises a multi-beam phased antenna array connected to an electronic gate controller. The gate controller analyzes the received signal strength indicator (RSSI) received from a smartphone within the lane to generate a position indication. The radiation power of the multi-beam phased antenna array is designed to restrict the communication distance within the lane. This solution is made on the insight that the Bluetooth communication protocol is beyond the user's control and the different communication task's shared between many others tasks of smartphones operating systems may result in unexpected time delays from time to time.

SUMMARY OF THE INVENTION

The main objective of the present invention is to improve passenger flow with access terminals for patrons with smartphones. Most of the latest developments concentrated in sophisticated electric designs and additional software related programs to improve the location detection of the smartphone trying to avoid false readouts of access credentials. The final goal-a continuous flow of patrons passing the access terminal-could not be reached until now.

The inventors have discovered that the most impacting fact is the Bluetooth communication protocol and inherent communication tasks. The invention proposes to arrange an additional physical proximity sensor within the lane to detect an approaching patron reaching the entry area, connected to the gate controller. The gate controller enables the data input supplied by the Bluetooth protocol via the multi beam phased antenna array only after the proximity sensor indicates the presence of a patron short before approaching the gate threshold to request transmission of the access credentials from the smartphone. The gate controller commands the signal-or blocking means to the open state if access credentials are validated and the field strength indicator's (RSSI) values are within predefined limits.

The design according to the invention prohibits both communication partners—the smartphone and the access terminal—from starting an exchange of data before the respective patron reaches the area in front of the threshold. As an advantageous result, the Bluetooth communication protocol is ready to exchange access data and will not be caught in program holdings and time delays caused by false RSSI's or false credentials from nearby patrons.

An advantageous example of the invention uses as a physical proximity sensor an infrared light beam directed into the access lane in front of the access threshold. Favorably, a post is arranged left or right to the access lane with a pivotable arm creating the access threshold in the closed position, and a physical IR-proximity sensor is mounted on this post (near to the pivotable arm).

BRIEF DESCRIPTION OF THE DRAWINGS

An embodiment of the invention will be described with respect to the following figures, in which.

DETAILED DESCRIPTION OF THE INVENTION

General properties of Bluetooth technology are described, for example, at "https://en.wikipedia.org/wiki/Bluetooth-_Low_Energy". Bluetooth is a standardized radio transmission method in the 2.4 GHz ISM band, with which devices can be connected in a surrounding area of 10 meters. In the following description, it is assumed that the communication processes of the standardized Bluetooth method are known, without being limited to the methods known under this term. The invention can also be applied to comparable radio communication methods.

Every mobile data carrier (i.e., smartphone) 1 is assigned a ticket app (a program module) that can be activated using Bluetooth and a unique identifier or a permission identifier that can be read via the latter. The unique identifier or the permission identifier can be a unique number in the system, which references the actual permission data such as valid location, valid period, valid value of the permission, or also valid personal data. The unique identifier or the permission identifier can also directly contain individual items or all of these permission data.

Figure 1:
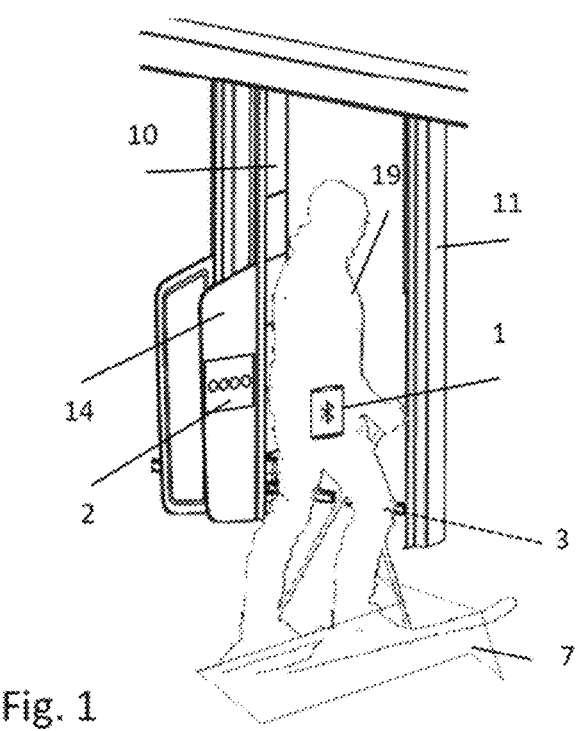
FIG. 1 shows an access terminal with one lane in oblique schematic view.

The user 19—a skier in the example according to FIG. 1—has a smartphone 1 and can comfortably carry it on the body in a pocket. A ticket app (program application), which can be uniquely identified via a UUID (Universal Unique Identifier), is installed on the smartphone 1. The access permission (ticket) is assigned to this UUID. The parameters (i.e. restrictions in terms of time, location, person, value) of the access permission can be stored directly in the app, or these parameters are assigned to the UUID in a database and can be retrieved from there for the validation.

FIG. 1 illustrates an access lane with a preferred access direction represented by the arrow 7. The access lane 7 may provide a width of 60 cm (about 25 inches) formed by guidance members such as posts 10,11 on both sides. As a result, only one person can enter through this lane. For handicapped persons and for people with larger baggage, a special lane may be provided. The entry area in front of the access threshold 3 is the waiting and checking area, the space behind the threshold is only intended to be reachable with a valid access permission. Further details of such a structure are described, for example, in EP 1990777. In the state shown here, a skier 19 has reached the entry area in front of the access threshold 3, his access permission is stored in a smartphone 1 with Bluetooth communication interface.

Figure 2:
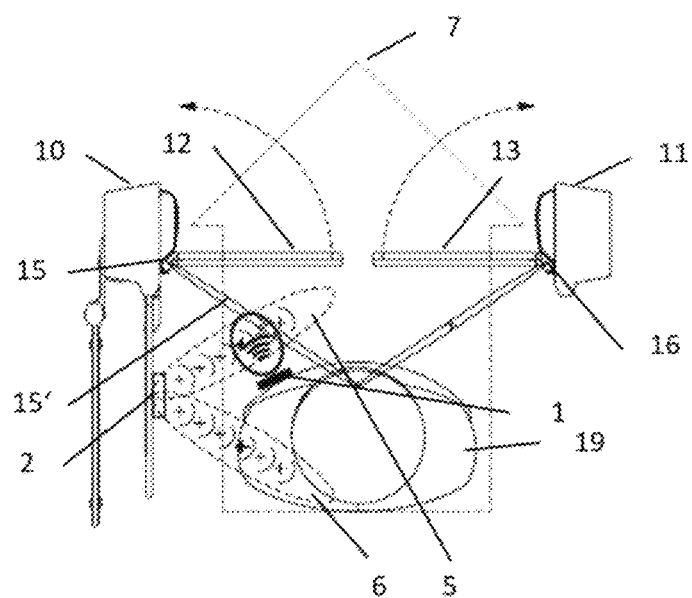
FIG. 2 is a top view of this access terminal.

The access threshold 3 is formed by barrier arms 12, 13 in the closed state (see also FIG. 2). These barrier arms 12, 13 are pivotally mounted on the posts 11, 12. The barrier arms 12, 13 can swing around a vertical axis by a motor and gear (not shown here). FIG. 2 shows the barrier arms 12,13 in the closed position. The dotted arrows show the opening movement of the barrier arms when access credentials have been validated.

The left-hand post 10 carries an antenna mounting plate 14 with a multiphase antenna array 2 which is arranged at a distance not more than one meter in front of the access threshold 3. This multiphase antenna array 2 produces two directed antenna beams, of which the first antenna beam 5 points immediately in front of the access threshold 3. The second antenna beam 6 is at a greater distance from the access threshold 3, viewed in the access direction.

Figure 3:
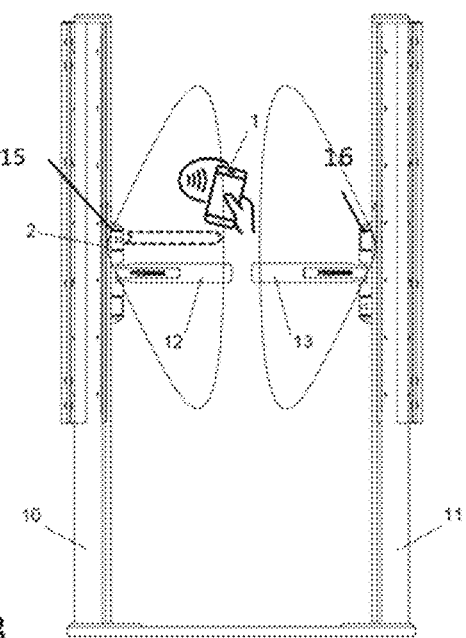
FIG. 3 is a front view with additional antenna on the right side of the lane.

FIG. 3 shows a variant access terminal in a front view from the entry area side. The posts 12, 10, 11 are not mounted overhead as in Fig.2 but rather are fixed to the ground. Furthermore, this variant carries on the right-hand post 11 a second multiphase antenna array 2. This mirrored design can be advantageous in order to be able to more easily detect a smartphone 1 carried on the right-hand side of the body of the user 19.

Near the barrier arms 12, 13 locations on both posts 10, 11, IR-proximity sensors 15, 16 are mounted. These IR-proximity sensors 15, 16 create infrared light beams 15' pointing into the entry area. If a skier (user) enters the lane and approaches the threshold 3, the light beams 15' are reflected and the respective IR-proximity sensor 15 creates a presence signal.

It should be noted that the IR-proximity sensor 15 is just an example and may be substituted by another technology such as a radar sensor or an ultrasonic sensor. It is important that this sensor 15 shall operate on a technology physically detecting the patron entering the lane.

Figure 4:
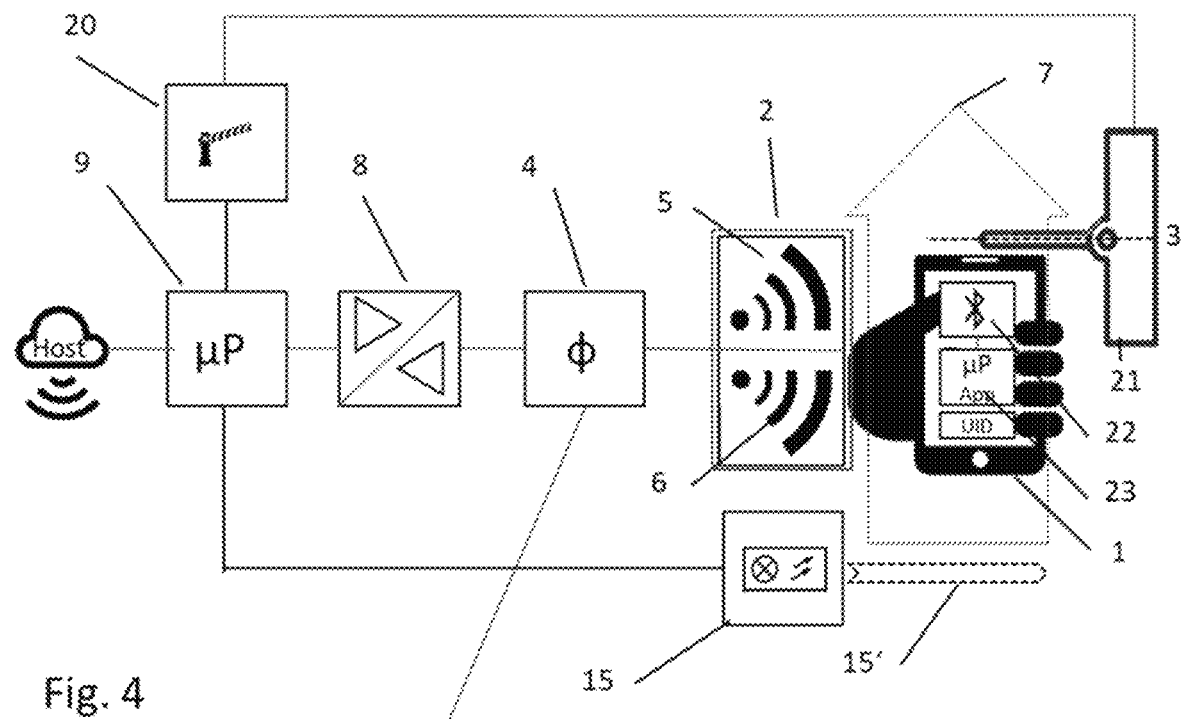
FIG. 4 is a block diagram of the electronic and mechanic components.

FIG. 4 shows a block diagram of circuit elements for the invention. The access control function is monitored and controlled by a gate controller 9. The gate controller 9 is connected to a Bluetooth transceiver 8, which contains the transmitting and receiving amplifier for the Bluetooth communication. The evaluation of the field strength of the radio signal, i.e. of the RSSI (Received Signal Strength Indicator), is important for the function. This signal is an indicator of the distance of the smartphone 1 relative to the entry threshold 3.

The Bluetooth transceiver 8 actuates the multiphase antenna array 2 via an antenna feed network 4. Antenna feed network 4 and multiphase antenna array 2 are formed such that at least two directed antenna beams 5 and 6 are created. The first antenna beam 5 points into an area immediately in front of the access threshold 3, viewed in the access direction. The second antenna beam 6 is oriented such that it is at a greater distance in front of the access threshold 3 than the first antenna beam 5, viewed in the access direction.

Figure 5:
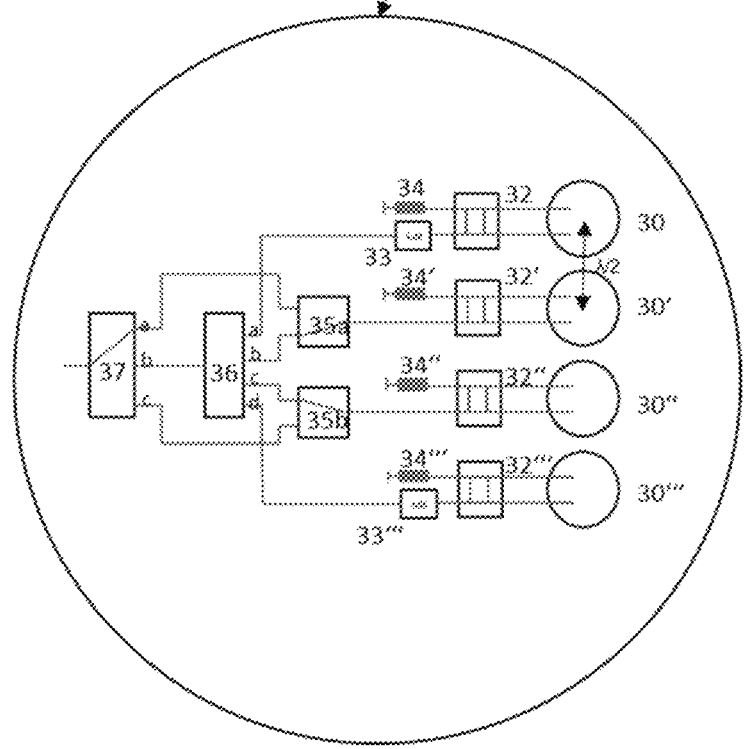
FIG. 5 shows a detail of the phase shifter for the antenna array.

FIG. 5 shows the antenna feed network 4 in conjunction with elements of the Bluetooth antenna array 2. The antenna array 2 uses four round patch antennas 30, 30', 30", 30''', which are in each case at a distance of $\lambda/2$ of the wavelength of the Bluetooth frequency from one another, viewed in the access direction. The patch antennas 30 are actuated via 90° hybrid dividers 32, which are terminated with 50 Ohm resistors 34. In each case, 6 dB attenuators 33 and 33''' are arranged upstream of the patch antennas 30 and 30" lying on the outside in order to make it possible to suppress the side beams. A 3-way switch 37 with the outputs a, b, c forms the input of the antenna feed network 4. The output 37a is connected to a 2-way switch 35a, the output 37c is connected to a 2-way switch 35b, the output 37b is connected to a power divider 36. The power divider 36 has 4 outputs a, b, c, d and two states. In the first state, the phase is shifted in each case by +90° at outputs a to d, and in the second state, the phase is shifted in each case by −90°. The output 36a actuates the patch antenna 30, the output 36d actuates the patch antenna 30″. The outputs 36b and 36c can be connected to the patch antennas 30′ and 30″ lying on the inside via switches 35a and 35b. The antenna network represented here can emit a circularly polarized electromagnetic wave in order to produce a more position-independent pairing with the smartphone. The two directed antenna beams 5 and 6 are produced by switching the power divider 36 from the first state into its second state. The inner patch antennas 30′ and 30″ can additionally be directly connected to the switch 37 via the switches 35a and 35b. The antenna network thus makes it possible to also use the phase difference of the signals at these antennas in addition to the position determination using the directed antenna beams 5, 6.

A description of the preferred operation of the access terminal will now be provided in more detail. In idle state, the blocking/signal means-represented here in FIG. 2 by barrier arms 12 and 13—are in the closed position blocking the lane against passing. The gate controller 9 switches the Bluetooth transceiver 8 and the antenna array 2 into standby mode.

A skier 19 enters the lane carrying his smartphone 1 in his pocket. A ticket app (program application) identified via the UUID, must be installed on the smartphone 1. The access credentials (ticket) are assigned to this UUID. The parameters (i.e. restrictions in terms of time, location, person, value) of the access credentials can be stored directly in the app, or these parameters are assigned to the UUID in a database and can be retrieved from there for the validation. The smartphone transmits continuously so-called advertising events, which is part of the Bluetooth communication protocol.

When the skier 19 approaches the threshold 3, he or she is physically detected by one or more IR-proximity sensors 15 and 16. As shown in FIG. 4, the IR-proximity sensor is connected to the gate controller 9 activating the check-in procedure. Via the Bluetooth transceiver 8 and the phase shifter 4, the advertising events are received and evaluated. If the RSSI of the received signals on one or two beams 5,6 fulfil the predefined strength criteria, a communication between the smartphone and the gate controller 9 is established (the gate controller 9 has already enabled the data input). If the gate controller 9 determines the parameters of the access credentials as valid, the gate controller 9 commands the barrier arms 12, 13 to move into the open position. Due to the fact that the Bluetooth communication is enabled only after the skier 19 has reached the position in front of the threshold 3, misreadings are very rare and Bluetooth communication tasks are ready.

It has been proven that operating the access terminal in an idle mode until the skier 19 is physically detected, the passenger flow can be improved significantly. An important feature of this invention is that only smartphones in the correct position must be handled by the RF-elements, and Bluetooth protocols and significantly less false communications occur—not blocking the "air".

It should be mentioned that logic operations can in principle be freely assigned to the circuit elements. Also, the validation can, for example, be done through inquiry in the database of the system. The validation can, however, also be done locally by the app installed on the smartphone transmitting the validity parameters via the Bluetooth interface, or the app checks autonomously and internally by determining whether its access parameters are valid for the location of the access point (access number). The term skier or user stands for any patron using the access terminal and is not limited to the shown example.

The invention claimed is:

1. An access control terminal for patrons having access credentials stored in smartphones with Bluetooth communication interfaces or comparable devices, the access control terminal comprising:
   guidance members to establish an access lane having a signal- or blocking element to define a gate threshold within the access lane between an entry area and a checked-in area, the access lane including a multi-beam phased antenna array to form a first beam and a second beam in the entry area with different distances to the gate threshold viewed in an access direction;
   an electronic gate controller, the multi-beam phased antenna array being connected to the electronic gate controller to communicate via the Bluetooth protocol with mobile Bluetooth communication devices, the electronic gate controller comprising programs to read out the access credentials stored in the smartphone, and being configured to analyze a received field strength indicator signal from signals received from the smartphone and to command the signal-or blocking element to move to an open state when the access credentials and the related field strength indicator signal (RSSI) have been approved; and
   a proximity sensor arranged within the access lane to detect an approaching patron reaching the entry area, an output of the proximity sensor being connected to the electronic gate controller,
   wherein the gate controller is configured to enable data input to be supplied by the Bluetooth protocol via the multi beam phased antenna array only after the proximity sensor indicates a presence of a patron within the access lane and approaching a gate threshold of the access lane to request transmission of the access credentials from the smartphone, and
   wherein the gate controller is configured to command the signal- or blocking element to move to the open state if the access credentials are validated and the field strength indicator signal values are within predefined limits.

2. The access control terminal according to claim 1, wherein the proximity sensor is configured to use an infrared light beam directed into the access lane in front of the gate threshold.

3. The access control terminal according to claim 2, wherein the guidance members include a post arranged at a left or right side of the access lane, the post having a pivotable arm creating the gate threshold in a closed position, wherein the proximity sensor is mounted on the post at the pivotable arm.

* * * * *